United States Patent [19]

Diez et al.

[11] 3,995,777
[45] Dec. 7, 1976

[54] GATLING VALVE

[76] Inventors: Jerry Diez, 317 W. Ascension, Gonzales, La. 70737; Wayne B. Summers, 13715 Calcasien Drive, Baton Rouge, La. 70805

[22] Filed: Aug. 6, 1975

[21] Appl. No.: 602,239

[52] U.S. Cl. .............................................. 222/370
[51] Int. Cl.² ........................................ G01F 11/10
[58] Field of Search ............................ 222/370, 302

[56] References Cited
UNITED STATES PATENTS 2,550,781  5/1951  Colburn ........................ 222/370 X
3,251,511  5/1966  Lloyd ............................ 222/370 X Primary Examiner—Allen N. Knowles
Assistant Examiner—Hadd Lane
Attorney, Agent, or Firm—Roy, Kiesel, Patterson, Hudson & Abadie

[57] ABSTRACT

A valve means having clustered sealable receiving chambers which after being filled material rotate to expose the chambers to an exit opening for emptying.

1 Claim, 10 Drawing Figures

GATLING VALVE

BACKGROUND OF THE INVENTION

1. Field of the Invention

This invention relates broadly to valves and dispensing devices, and more particularly to a valve for controlling the flow of solid abrasive or corrosive material from one location to another.

2. Prior Art

There are varieties of valves available for particular uses. Exemplary of this art are U.S. Babcock Pat. No. 1,951,121, U.S. Weber Pat. No. 2,544,575, U.S. Ready Pat. No. 2,546,702, U.S. Topping Pat. No. 2,904,228 and U.S. Tometsko Pat. No. 3,504,237. For the handling of abrasive or corrosive materials, the "star feeder" valve has achieved the greatest commercial success.

Problems relating to leakage and corrosion within the valves, as well as, life expectancy of the valve still exist and lead to down time, destruction of other property, or injury to persons handling the valves. In addition, present commercial valves may cause damage to the material passing through them. Another problem is the loss of vacuum in a material transfer system when the material is being passed through the valve. Reduction or elimination of these problems would be of great benefit to various industries including the petrol chemical industry.

SUMMARY OF THE INVENTION

It is an object of this invention to provide a valve that does not leak, even when handling corrosive or abrasive materials.

Another object of this invention is to provide a valve with a long life expectancy even when handling corrosive or abrasive materials.

Still another object of this invention is to provide a valve which can meter the amount of material flowing through it.

A further object of this invention is to provide a valve which can be remotely closed.

A still further object is to provide a valve that will not damage the material passing through it.

Another object is to provide a valve that will not cause loss of vacuum in a transfer system when material is passed through the valve.

Other objects and advantages of this invention can be seen from the ensuing descriptions of the invention.

Accordingly, a valve means having within a container, clustered receiving chambers rotatable about a common axle, each chamber having an entrance and exit opening extending through sealing gatling plates which connect with entrance and exit container openings, respectively, at different times during the rotation of the chamber about the axis.

PREFERRED EMBODIMENTS OF THE INVENTION

Figure 1:
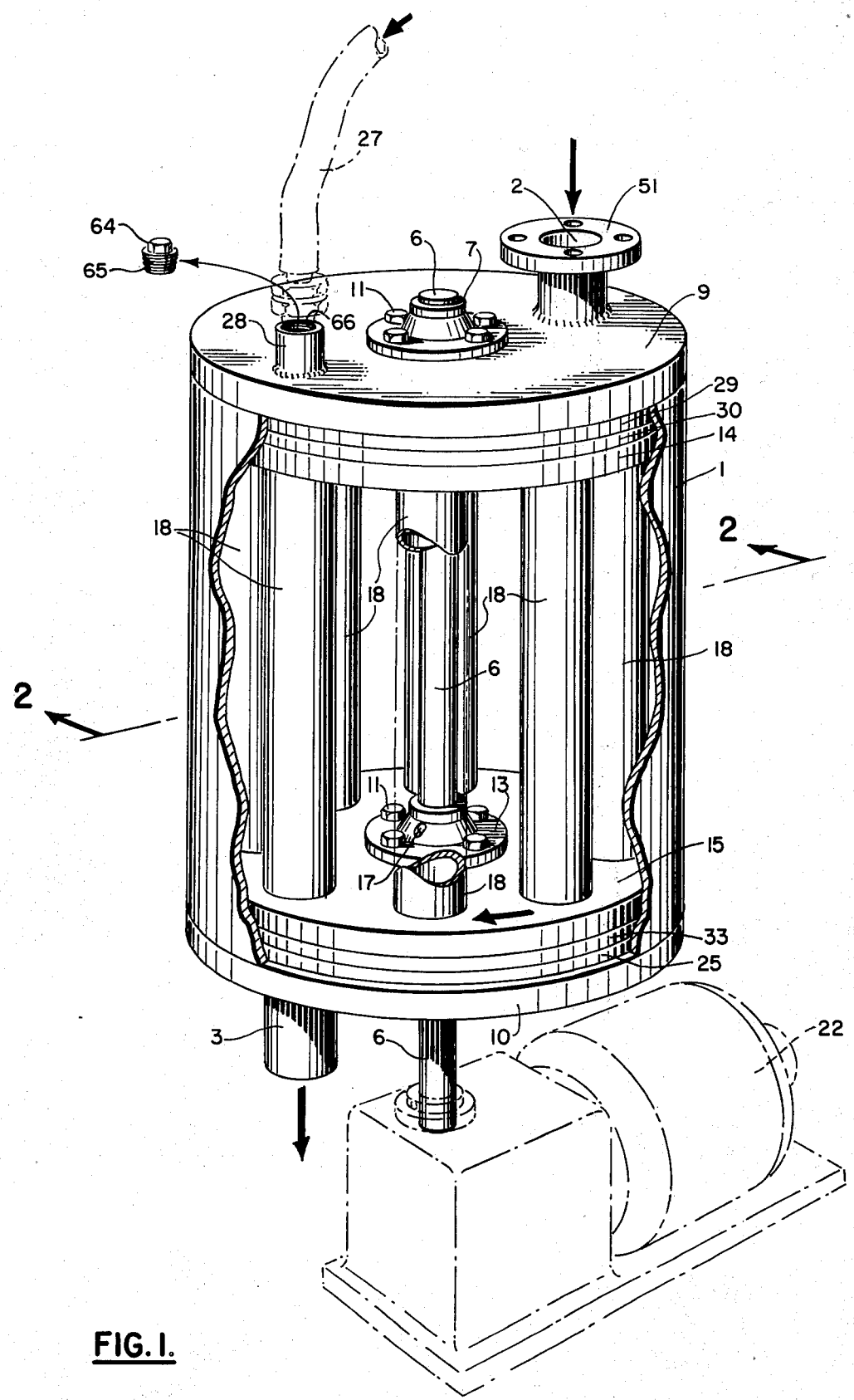
FIG. 1 is a perspective cutaway view of one embodiment of this invention.
Figure 2:
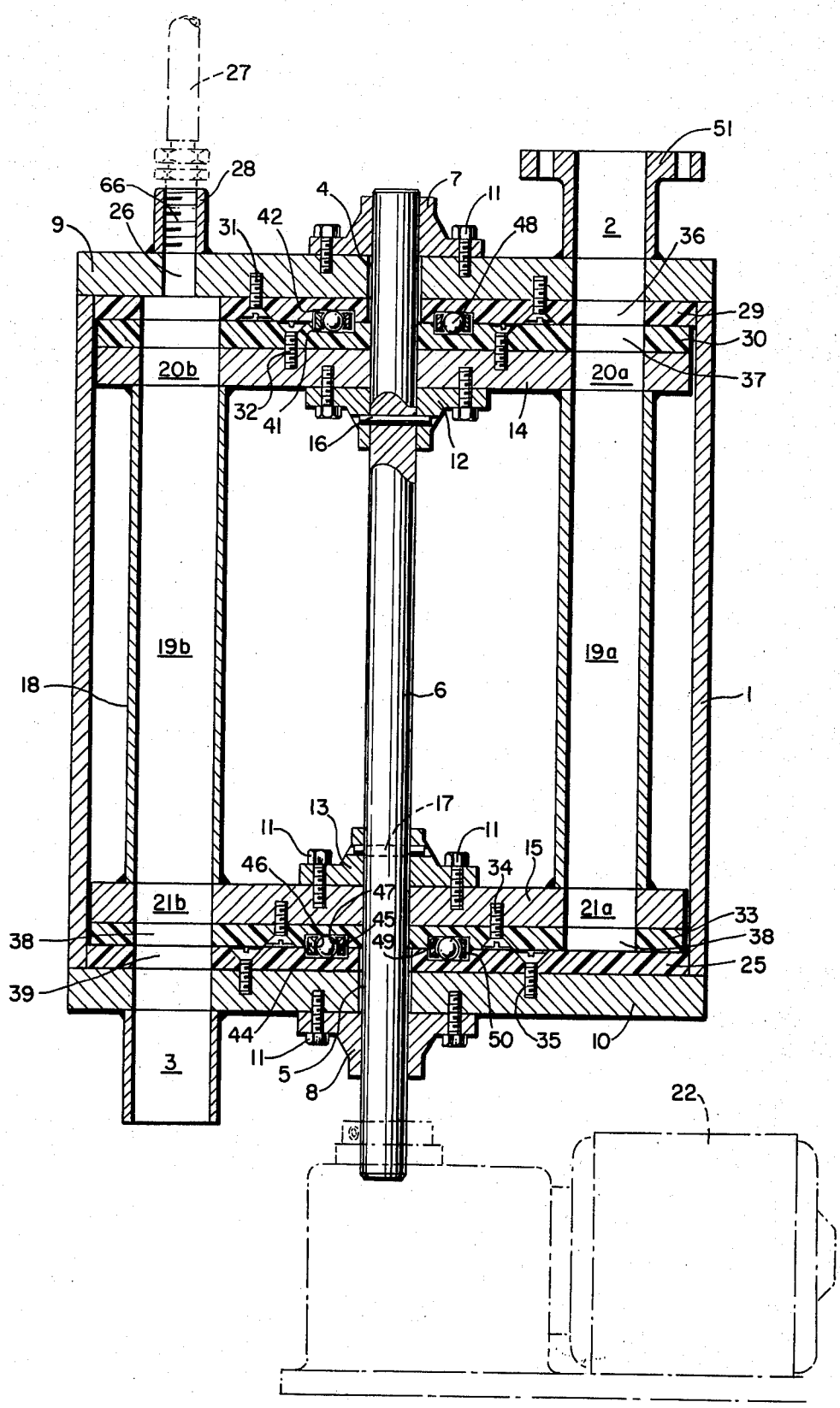
FIG. 2 is a cross-sectional view taken along lines 2 — 2 of FIG. 1.
Figure 3A:
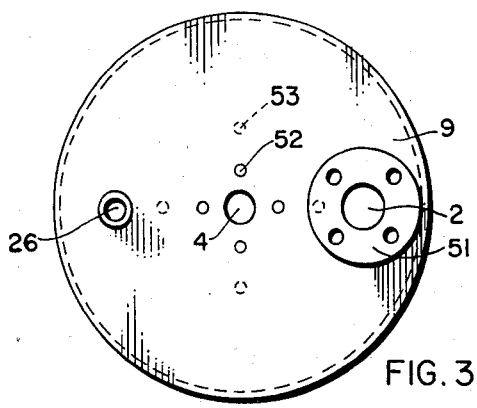
FIG. 3A is a top planar view of the top of the top structure wall.
Figure 3E:
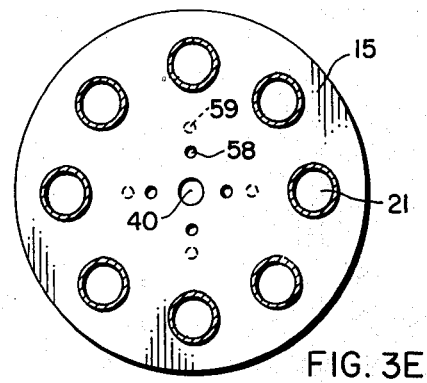
FIG. 3E is a top planar view of the bottom gatling plate.
Figure 3B:
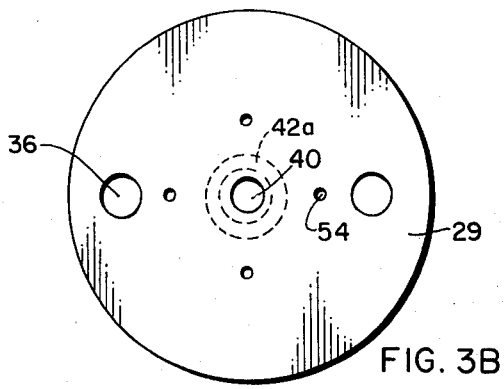
FIG. 3B is a top planar view of the top container liner.
Figure 3F:
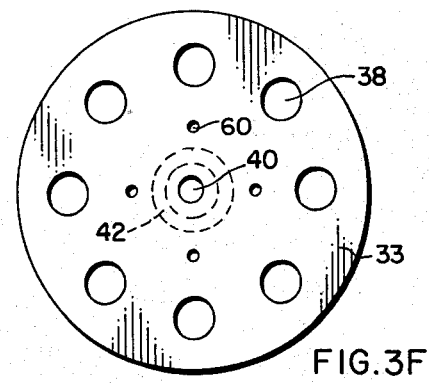
FIG. 3F is a top planar view of the bottom gatling plate liner.
Figure 3C:
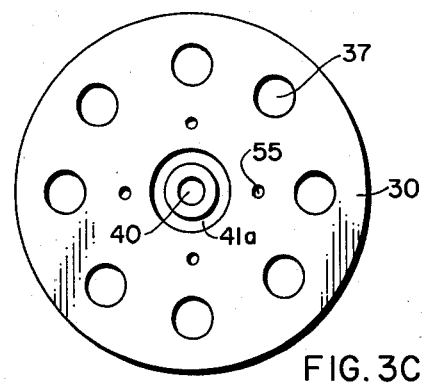
FIG. 3C is a top planar view of the top gatling plate liner.
Figure 3G:
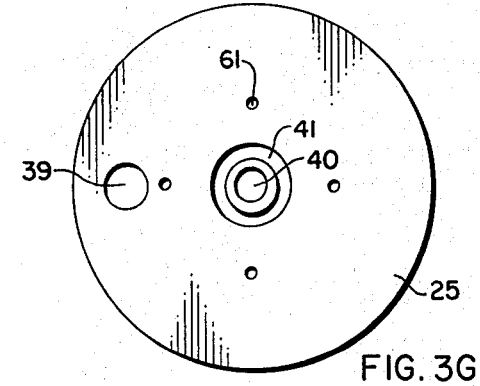
FIG. 3G is a top planar view of the top of the bottom wall liner.
Figure 3D:
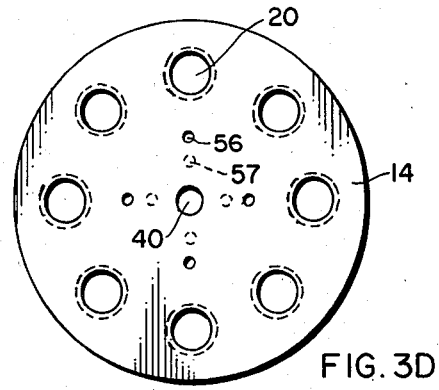
FIG. 3D is a top planar view of the top gatling plate.
Figure 3H:
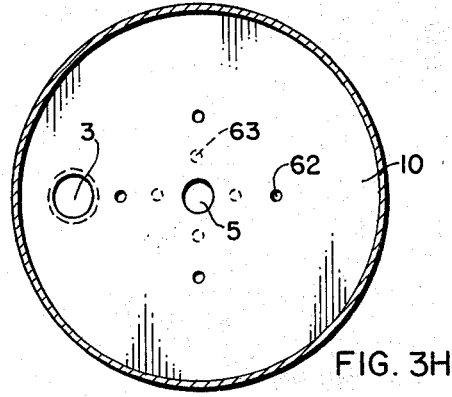
FIG. 3H is a top planar view of the top of the bottom structure wall.

Referring to FIGS. 1 – 3 the valve device of this invention comprises an outer shell structure 1 having a material inlet opening 2 and a material exit opening 3. Through the center of structure wall openings 4 and 5, is located axle 6 which is held vertically in position by collars 7 and 8 attached to structure walls 9 and 10, respectively by screws 11 which mate into threaded openings 52 and 63, respectively. Axle 6 is held horizontally in position by collars 12 and 13 which are attached to top and bottom gatling plates 14 and 15, respectively, by bolts 11A and 11B, respectively, which screw into threaded openings 57 and 58, respectively. Axle 6 is attached to collars 12 and 13 by pins 16 and 17 in a manner that will cause gatling plates 14 and 15 to rotate when axle 6 rotates. Also attached to gatling plates in circular fashion are receiving chambers 18 having center cavities 19 aligned with top and bottom gatling plate openings 20 and 21, respectively.

In operation material passes through openings 2 and 20 and into cavity 19A. Once the desired amount of material has entered cavity 19A, gatling plates 14 and 15 are rotated by motor means 22 turning axle 6. The material is held within chamber 19A by bottom wall liner 25. As gatling plate 14 rotates about axle 6, it seals off opening 2 until another receiving chamber 18 is in position aligned with opening 2. After sufficient rotation, opening 21A aligns with exit opening 3 which allows the material to leave cavity 19A.

In a preferred feature, the valve may be provided with air opening 26, aligned with gatling plate openings 20B and 21B, cavity 19B and exit opening 3. Air hose 27, provided with threads 23, screws into matching threads 24 of nozzle 28 and air can be used to force the material from cavity 19B. This feature is particularly preferred in high speed operations or where adhesive material is being passed through the valve. It is especially preferred that opening 26 be smaller than chamber cavity 9B. When it is desired not to use air hose 27, then plug 64 having threads 65 which mate with threads 66 of nozzle 28 can be screwed into seal opening 26.

In another preferred feature, both structure wall 9 and top gatling plate 14 are provided with low friction surface liners 29 and 30, respectively, which are attached by recessed screws 31, and 32, respectively, that screw into threaded openings 53 – 54 and 55 – 56, respectively. These liners can be constructed of material such as Teflon that would reduce the friction during rotation of top gatling plate 14. Similarly, bottom gatling plate 15 and bottom structure wall 10 are provided with low friction surface liners 33 and 25, respectively, which are attached by recessed screws 34 and 35, respectively, that screws into threaded openings 59 – 60 and 61 – 62, respectively. Each of the liners have openings 36, 37, 38 and 39 as shown in FIG. 3 that are aligned with openings of the structure wall or place to which they are attached. Each of the liners are also provided with an opening 40 through which axle 6 may pass.

In a more preferred feature, liners 25 and 33 are provided with aligned recesses 41 and 42, respectively, which form a circular cavity within the liners and around axle 6. Within this cavity is placed a bearing collr 43 comprising concentric metal rings 44 and 45, which have concave wall surfaces 46 and 47, respectively, which loosely hold in position multiple spherical bearings 48. The rings are of a depth less than the diameter of the bearings and positioned so that bearings contact both recess walls 49 and 50. In this manner, the path of rotation about axle is controlled and resistance to the rotation lessened. Similarly, liners 29 and 30 are provided with aligned recesses 42A and 41A.

The number of size of chambers 18 can, of course, be varied depending upon the material being controlled. Inlet opening 2 can be provided with a glange 51 or other suitable connecting member for securing the valve to the material container. Exit opening 3 could also be similarly provided. These and other alternate obvious embodiments can be done within the scope of this invention and are meant to be included within this invention.

What I claim is:

1. A valve means which comprises:
 a. a casing having a top and bottom wall;
 b. an axle secured to said walk by means allowing rotation of said axle;
 c. a drive means attached to said axle to cause rotation of said axle;
 d. an assembly of receiving chambers attached to said axle in a manner to rotate with said axle, said assembly having top and bottom plates attached to either end of receiving chambers, said plates and chambers having aligned passageways which at different times during rotation about said axle are aligned first with an inlet opening in said top wall and then, after rotation, aligned with an exit opening in said bottom wall, said plates having solid members that seal off said inlet and exit openings when no passageway is aligned with them; and
 e. liners constructed or material having a low coefficient of friction and attached on each of said top and bottom walls and said top and bottom plates, said top wall liner being in contact with said top plate liner and said bottom wall liners being in contact with said bottom plate liner, each of said liners having openings aligned with said openings of said wall or plate to which said liner is attached; said adjacent liners having aligned recesses that form circular cavities about said axle in which is positioned a bearing collar means having bearings contacting walls of said recesses.

* * * * *